Feb. 13, 1923.

R. W. FULTON 1,444,908

POWER TRANSMITTING AXLE

Filed Oct. 29, 1921

2 sheets-sheet 1

WITNESSES

Ethel A Jeter

Walter Ahrens

Richard W. Fulton

INVENTOR.

Feb. 13, 1923.

R. W. FULTON

POWER TRANSMITTING AXLE

Filed Oct. 29, 1921

1,444,908

2 sheets-sheet 2

Richard W. Fulton
INVENTOR.

WITNESSES
Ethel A Teter
Walter F. Ahens

Patented Feb. 13, 1923.

1,444,908

UNITED STATES PATENT OFFICE.

RICHARD W. FULTON, OF NEW YORK, N. Y.

POWER-TRANSMITTING AXLE.

Application filed October 29, 1921. Serial No. 511,390.

*To all whom it may concern:*

Be it known that I, RICHARD W. FULTON, a citizen of the United States, residing at New York, in the county of New York and State of New York, have invented certain new and useful Improvements in Power-Transmitting Axles, of which the following is a specification.

My invention relates to power transmitting axles in which the engine power, of a motor vehicle, is transmitted to the road wheels with a considerable gear reduction, thereby providing an axle adapted for use with heavy motor vehicles.

The objects of my invention are, first, to provide an axle of the type referred to which will be light in weight; second, to reduce the cost of construction; and, third, to increase the efficiency of such an axle.

I attain these and other objects, as hereinafter pointed out, by the mechanism illustrated in the accompanying drawing in which—

Figure 1:
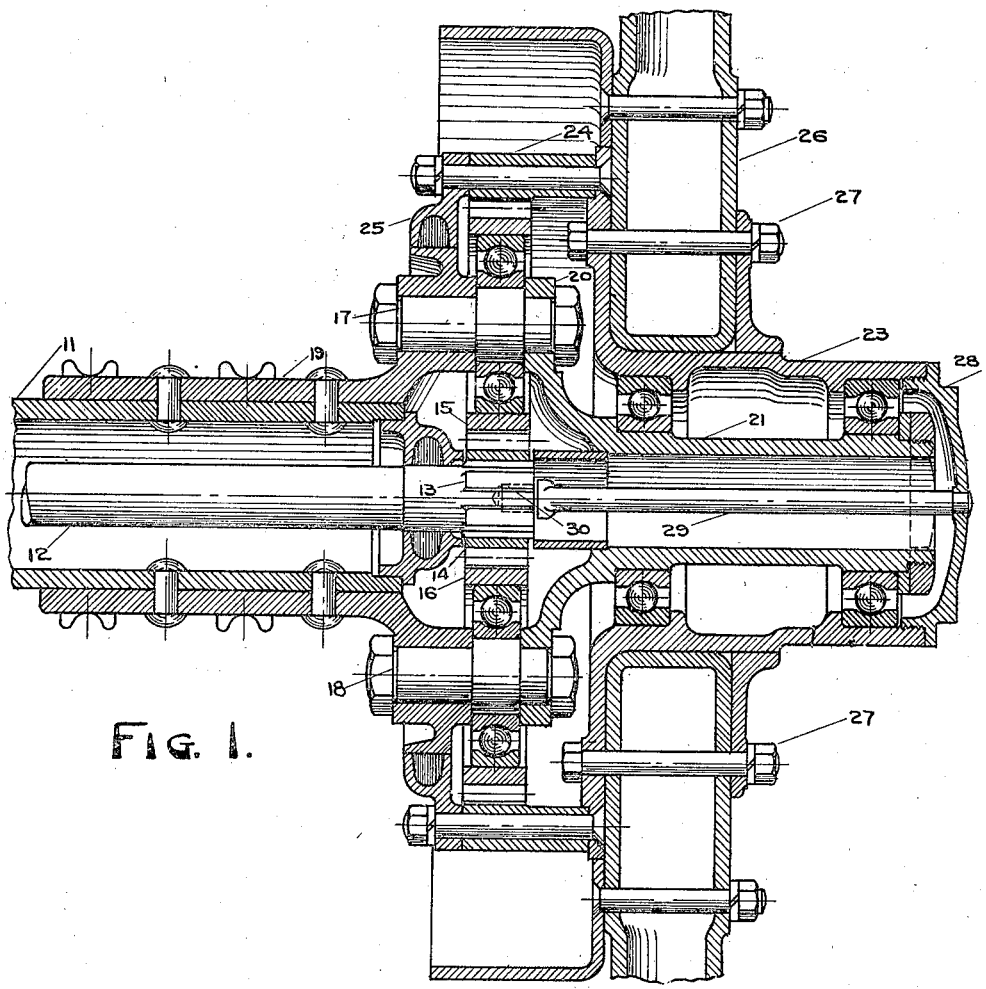
Figure 2:
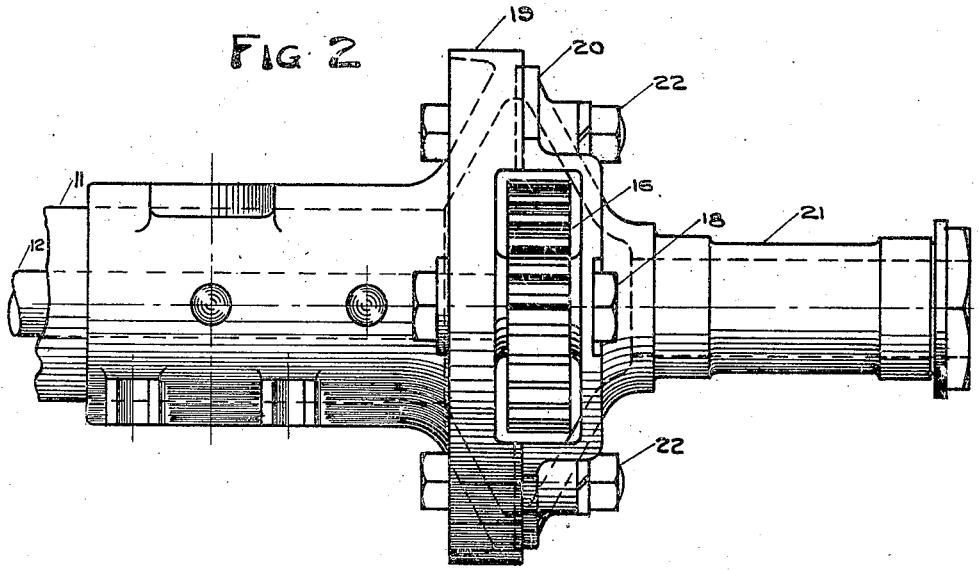
Figure 3:
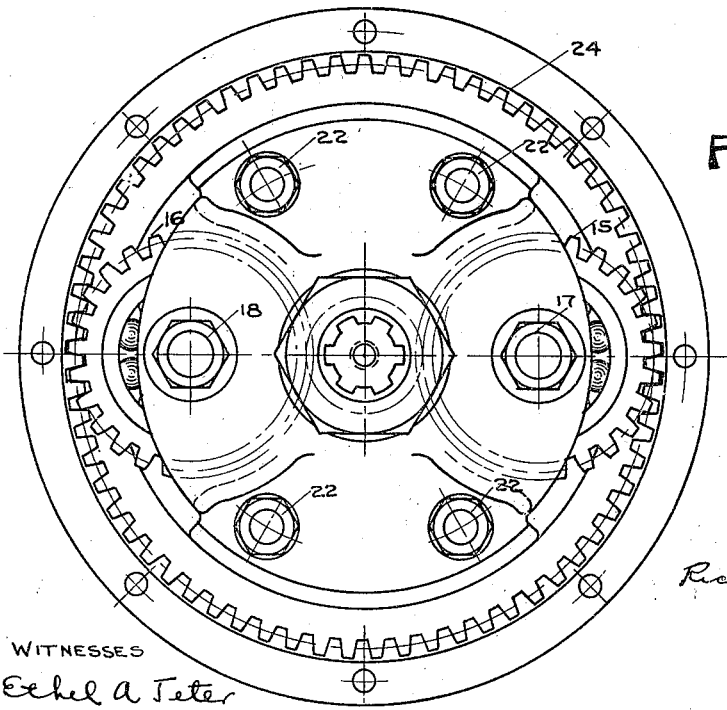

Figure 1 is a central longitudinal section of part of the load carrying axle and one of the wheels; Fig. 2 is a side elevation of one end of the axle as shown in Fig. 1; Fig. 3 is an end elevation of Fig. 2 with the wheel and hub removed.

Similar reference characters refer to similar parts throughout the several views.

Referring to Fig. 1, the central part of the load carrying axle 11 is hollow and forms a housing for the bevel driving gears and differential mechanism, which parts are not shown, but are of the type commonly used in automobile axles. The power transmitting shafts, one of which is indicated as 12, are enclosed within the axle 11, the inner ends of said shafts receive the power which they transmit from said differential. At the outer ends of said shafts, and connected therewith by the splines 13 is a pinion 14 which meshes with the intermediate gears 15 and 16. It will be seen, in the preferred construction shown, the teeth of the gears 15 and 16 support the pinion 14 and the outer end of the shaft 12, and a journal is not required for the outer end of said shaft.

The pins 17 and 18, on which the gears 15 and 16 are journaled respectively, are supported at their inner ends by the extension piece or flange 19, on the axle 11, and the outer ends of said pins are supported by the flange 20 which forms part of the stub axle 21. The flange 20 of said stub axle is further rigidly connected to the extension piece 19 by the bolts 22. The central housing 11; the extension piece 19, and the stub axle 21, when bolted together, form the load carrying axle with openings wherein the gears 15 and 16 are mounted.

It will be seen that the stub axle 21 may be made concentric with the power transmitting shaft 12, in which case the hub 23, journaled on the stub axle, together with the internal gear 24 carried by said hub, will be concentric with the pinion 14. The internal gear 24 is in the plane of and meshes with the intermediate gears 15 and 16, therefore power imparted to rotate the shaft 12 and the pinion 14, will be transmitted through the intermediate gears 15 and 16 to the internal gear 24, thereby rotating the hub 23 with a considerable reduction of speed between said shaft and said hub.

An annular cover plate 25 is attached to the internal gear 24 to form an oil-enclosing chamber for the gears, said cover plate forming a running joint with the extension piece 19 at a point inwardly of the gears.

Mounted on the hub 23 is a wheel 26, which may be of any desired type. By removing the nuts 27 said wheel may be removed from the hub 23 without removing said hub or any of the gearing.

At the outer end of the hub 23 is a cap 28 to which is attached an inward extension or stub 29, said stub serving as an abutment to hold the shaft 12 in position longitudinally. Whenever it is desired to remove the shaft 12, the cap 28, together with the stub 29 is unscrewed from the hub, and a withdrawing-rod may then be screwed into the threaded hole 30 in the end of the shaft 12, for the purpose of withdrawing said shaft.

Prior to my invention axles have been made in which the wheel is concentric to the power transmitting shaft and with a gear reduction between the power shaft and the wheel, but in such axles it is usual to have a special wheel with the gears inside, and it has been necessary in such prior axles to take the wheel apart when removing it from the axle. In my invention it is possible to use ordinary types of wheels, thus reducing the cost of manufacture, and to easily remove such wheels as hereinbefore pointed out.

It will also be seen that my invention further differs from somewhat similar axles previously constructed, in that in such previous types one of the antifriction wheel bearings has been mounted on the axle inwardly of the gearing. In such prior axles it is necessary to use a very large diameter wheel-bearing to encompass the axle at this point. In my invention both bearings are mounted outwardly of the gearing and smaller diameter bearings can be used, thus reducing the cost of construction. also in my invention the load carrying axle can be made larger, at the point inwardly of the gears, and consequently of lighter section.

It is intended that the above description and drawings shall be considered as illustrative and not in a limiting sense, and many changes may be made in this invention by those skilled in the art without departing from the spirit of the invention as set forth in the following claims.

What I claim is:

1. In a driving mechanism, a hollow axle with an end adapted to have a wheel journaled thereon, a power shaft and a pinion thereon within said axle, said axle having a longitudinal opening through the end, through which said power shaft may be withdrawn, a plurality of intermediate gears projecting through lateral openings in the axle into engagement with said pinion and supporting said pinion and the outer end of said shaft, a wheel journaled on the end of said axle entirely outwardly of said lateral openings and intermediate gears, and an internal gear mounted on said wheel and meshing with said intermediate gears.

2. In a driving mechanism, a hollow axle, a power shaft and pinion thereon within said axle, means for forming a slidable driving engagement between said shaft and said pinion, said axle constructed to form a longitudinal opening therethrough and through which said shaft may be withdrawn without removing said pinion, an intermediate gear projecting through a lateral opening in the axle and into engagement with said pinion, a wheel journaled on the end of said axle entirely outwardly of said lateral opening and intermediate gear, and an internal gear mounted on said wheel and meshing with said intermediate gear.

3. In a driving mechanism, a hollow load carrying axle comprising an end, a power shaft concentric with said axle end, said axle end having a longitudinal opening through which said power shaft may be withdrawn, an intermediate gear meshing with said pinion, a wheel journaled on the axle end entirely outwardly of said intermediate gear, and an internal gear mounted on said wheel and meshing with said intermediate gear.

4. In a driving axle, in combination, a hollow load carrying axle, a tubular stub axle rigidly attached to the end of said load axle, a power shaft enclosed within said hollow axle and adapted to be withdrawn longitudinally through said tubular stub axle, a pinion having a driving engagement with the end of said shaft, an intermediate gear meshing with said pinion, a wheel journaled entirely on said stub axle, and an internal gear mounted on said wheel and meshing with said intermediate gear.

5. In a driving mechanism, a hollow load carrying axle with a tubular end adapted to have a wheel journaled thereon, a power shaft within said axle and adapted to be withdrawn through said tubular end, a pinion having a driving engagement with the end of said power shaft, an intermediate gear projecting through an opening in the side of said axle and into engagement with said pinion, a wheel journaled on the tubular end entirely outwardly of said opening and intermediate gear, and an internal gear mounted on said wheel and meshing with said intermediate gear.

6. In a driving mechanism, a hollow load carrying axle comprising an end, a power shaft and pinion thereon within said axle, said axle end being constructed to form a longitudinal opening therethrough and adapted to permit withdrawal of the power shaft therethrough, a wheel journaled on said said axle end, and gearing adapted to transmit power from said shaft and pinion to said wheel, said gearing being inwardly on the axle relatively to the journals of said wheel.

7. In a driving axle, in combination, a load carrying axle having a hub journaled thereon, a power shaft parallel to said axle, a pinion on the end of said shaft, an intermediate gear meshing with said pinion and positioned inwardly of the journals for said hub, an internal gear mounted on said hub and meshing with said intermediate gear, and a wheel detachably mounted on said hub.

8. In a driving axle, in combination, a hollow load carrying axle, a tubular stub axle attached to the end of said hollow axle, a power shaft enclosed within said hollow axle and adapted to be withdrawn longitudinally through said tubular stub axle, a hub journaled entirely on said stub axle, a pinion having a driving engagement with the end of said shaft, a plurality of intermediate gears meshing with said pinion, an internal gear mounted on said hub and meshing with said intermediate gears, and a wheel detachably mounted on said hub.

9. In a driving axle, in combination, a hollow load carrying axle, a tubular stub axle attached to the end of said hollow axle, a power shaft enclosed within said hollow axle and adapted to be withdrawn longitudinally through said tubular stub axle, a hub journaled entirely on said stub axle, a pinion having a driving engagement with the end of said shaft, a plurality of intermediate gears meshing with said pinion, an internal gear mounted on said hub and meshing with said intermediate gears, an annular lubricant enclosing cover mounted on said hub and having a running joint with the load axle inwardly of said gears, and a wheel detachably mounted on said hub.

RICHARD W. FULTON.